United States Patent [19]
Kiefer et al.

[11] 3,776,782
[45] Dec. 4, 1973

[54] POLYESTER AND POLYAMIDE ADHESION IMPROVERS

[75] Inventors: Thomas J. Kiefer, Ambler, Pa.;
Masamichi Nagatani, Tokyo, Japan

[73] Assignee: Amchem Products, Inc., Ambler, Pa.

[22] Filed: Mar. 15, 1971

[21] Appl. No.: 124,562

[52] U.S. Cl. ...... 148/6.15 Z, 148/6.15 R, 148/6.16, 117/75
[51] Int. Cl. .............................................. C23f 7/08
[58] Field of Search ................................ 260/233.5; 148/6.15 R, 6.15 Z, 6.16; 117/84, 165, 75

[56] References Cited
UNITED STATES PATENTS

| | | | |
|---|---|---|---|
| 3,519,495 | 7/1970 | Plaxton | 148/6.16 |
| 3,625,777 | 12/1971 | Okabe et al. | 148/6.15 Z |
| 2,636,257 | 4/1953 | Ford | 117/75 X |
| 2,887,405 | 5/1959 | Wooding | 117/75 X |
| 3,164,488 | 1/1965 | Workman | 117/75 |
| 3,565,699 | 2/1971 | Plaxton | 148/6.16 |
| 3,573,997 | 4/1971 | Plaxton | 148/6.16 |

*Primary Examiner*—Ralph S. Kendall
*Attorney*—Synnestvedt & Lechner

[57] ABSTRACT

Prior to applying an alkyd paint to a metallic surface or to a pre-paint coating covering a metallic surface, there is applied to said surface or said coating a polyester or a polyamide for the purpose of improving the adhesion of said paint. The polyester or polyamide can be applied from an aqueous rinse solution or from a final rinse solution.

11 Claims, No Drawings

3,776,782

POLYESTER AND POLYAMIDE ADHESION IMPROVERS

FIELD OF THE INVENTION

This invention relates to the treatment of metallic surfaces for the purpose of improving the adhesion of a resinous coating applied thereto. More particularly, this invention relates to improving the adhesion of an ester-type resinous coating, such as an alkyd resinous paint, to a metallic surface that has thereon a pre-paint coating.

It is well known to coat metallic surfaces prior to applying thereto a resinous coating or paint film which is aesthetic and/or functional in nature. A function of the pretreatment coating, often referred to as a pre-paint coating, is to inhibit corrosion of the metallic surface that would tend to be caused by moisture or other corrosive materials penetrating the resinous coating or paint film. Also, the pre-paint coating should inhibit or prevent undercutting of the resinous coating or paint film that would tend to be caused by corrosive materials acting on the metallic surface as a result of the organic film being chipped, scratched, pierced or otherwise ruptured.

An example of a pre-paint coating which forms a corrosion resistant barrier on a ferriferous surface is a zinc phosphate coating. Corrosion resistant chromate coatings are examples of coatings which protect aluminum surfaces from corrosive materials.

To function as intended, the pre-paint coating must be such that the resinous coating or paint film adheres tightly thereto.

It is noted that many types of metallic surfaces are relatively poor paint bases, that is, the resinous coating or paint film does not adhere well to the bare metallic surface. In some applications, the primary purpose of the pre-paint coating is to provide a base to which the resinous coating or paint film will adhere readily and tightly; any protection against corrosion that is afforded by the pre-paint coating is of secondary importance.

A popularly used film-forming resin that is applied to metallic surfaces having thereon a pre-paint coating is an alkyd resin. An alkyd resin is a polyester that can be prepared by reacting a polyhydric alcohol, a polybasic acid and a monobasic fatty acid.

This invention relates to improving the adhesion between a film-forming polyester resin, for example, an alkyd resin and a metallic surface, particularly a metallic surface that has thereon a pre-paint coating.

PRIOR DEVELOPMENTS

The relatively few developments in the prepaint or metal pre-treatment field directed to improving paint adhesion have one or more shortcomings.

A method for improving paint adhesion, but a limited one in that it is confined to zinc phosphate coatings, is to produce zinc phosphate coatings with lower coating weights. The general rule is that the lower the coating weight of a zinc phosphate coating the better the paint adhesion. One way of lowering the coating weight is to modify a zinc phosphate coating solution in a manner such that the zinc phosphate coating formed from the solution has a lower weight than would be obtained had the coating solution not been modified. Additives which have been incorporated into zinc phosphate coating solutions to produce lower coating weights are disodium glycerol phosphate and starch phosphate. Another way of producing a lower weight coating is to subject the zinc phosphate coating to an after treatment which dissolves some of the coating. This can be done by contacting the coating with a strong acidic solution.

A disadvantage of the above method is that the improvement in paint adhesion is obtained usually at the expense of some loss in corrosion resistant properties of the coated metallic surface.

Improvements in paint adhesion have been obtained also as a result of treating pre-paint coatings with final rinse solutions. For example, it has been reported that the rinsing of an iron phosphate coating with a dilute aqueous rinse solution of chromic acid can result in improved adherence of the paint film to the coating. In U.S. Pat. No. 3,063,877, it is reported that a final rinse solution prepared from the reaction of hexavalent chromium and formaldehyde and containing both hexavalent and reduced chromium is effective in improving both the corrosion resistant and paint adhesion properties of pre-painted and painted metallic surfaces.

Although final rinse solutions such as those mentioned above can be effective in improving paint adhesion, it is recognized generally that their principal value is in improving the corrosion resistant properties of the coated surface either by passivating exposed metal or by sealing the pores of the pre-paint coating. Except perhaps in some limited cases, the extent to which they improve paint adhesion tends to be marginal.

In the overall picture, there is a need for improving the adhesion of paint to metallic surfaces and it is an object of this invention to provide the means to do so.

BRIEF SUMMARY OF THE INVENTION

In accordance with this invention it has been found that improvements in paint adhesion can be realized by applying to a metallic surface or to a metallic surface having thereon a pre-paint coating, an adhesion improver, as described below, and thereafter applying to the thus treated surface a film-forming resinous coating composition comprising a polyester resin, for example an alkyd resin. Adhesion improvers within the scope of this invention include polyesters and polyamides.

It is believed that the invention will have its widest use in applications wherein the adhesion improver is applied from an aqueous solution to a pre-paint coating formed on a metallic surface. The adhesion improver can be dissolved or dispersed in a water rinse which is used to rinse the pre-paint coating to remove therefrom excess or spent pre-paint coating solution. Or it can be dissolved or dispersed in a final rinse solution which is applied to the pre-paint coating to improve its corrosion resistant properties.

As will be explained more fully below, the adhesion improver can be deposited on the metallic surface or on the prepaint coating in the form of discrete particles or as a continuous or discontinuous film. Generally speaking, the thickness of the film of adhesion improver will be substantially less than the coating or film that is formed from the subsequently applied film-forming resinous coating composition. For example, the thickness of the film of adhesion improver can be on the order of several molecules in thickness or even less.

After the adhesion improver has been deposited, the surface can be covered with a film-forming resinous coating composition comprising a polyester resin. The term "film-forming resinous coating composition" as used herein is intended to include both pigmented and non-pigmented coating compositions and thus encompasses within its meaning paints and also clear resinous coatings such as, for example, varnishes and lacquers. It is believed that the invention will have its widest use with alkyd paints — a very popular polyester paint, as noted above.

The presence of the adhesion improver of this invention on the surface improves the bond between the coating formed from the film-forming resinous coating composition and the surface. This, of course, is an important advantage because coating or paint loss can be lessened or avoided when the metal is deformed as by bending, impact or forming operations.

Another advantage that is provided by this invention is that improved paint adhesion properties can be realized absent an adverse affect on corrosion resistant properties. Furthermore, the adhesion improvers of the present invention can be applied in prepaint treatment stages that presently are used in commercial prepaint treatment lines.

DETAILED DESCRIPTION OF THE INVENTION

The adhesion improvers of this invention are used with film-forming resinous coating compositions which must contain a polyester resin. Polyester resins are polymeric condensation products having a backbone in which hydrocarbon units which make up the backbone are joined together by ester linkages

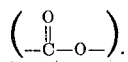

Polyester resins can be prepared by the esterification between a polycarboxylic acid and a polyhydric alcohol or by polymerizing a hydroxy-substituted carboxylic acid. Many types of polyester resins can be used in film-forming resinous coating compositions.

In work connected with the development of the present invention, it was found that improvements in paint adhesion are not attained when the film-forming resinous coating composition does not contain a polyester resin, but instead contains other types of resins having ester linkages which are not part of the backbone of the resin. Examples of such resins are the acrylics and the acrylates in which the ester linkages are part of the side chains of the polymer but not the backbone thereof. However, and as will be discussed more fully below, this invention can be practiced effectively with film-forming resinous coating compositions which contain such polymers as the acrylates and acrylics, as well as others, as long as the film-forming resinous coating composition contains a polyester resin also.

The most widely used polyester resins in film-forming resinous coating compositions are resins prepared by esterifying a polyhydric alcohol, a polybasic acid and a monobasic fatty acid. Such resins are termed "alkyd" resins. Authoritative discussions on alkyd resins and polyester resins are found in the following publications: The Chemistry of Synthetic Resins by Ellis, Volume II, Reinhold Publishing Corporation, New York, 1935, and The Encyclopedia of Chemical Technology by Kirk and Othmer, Interscience Publishers, New York, 1963.

Examples of polybasic acids (or anhydrides thereof) which are used in preparing alkyd resins are: phthalic anhydride; azelaic acid; maleic anhydride; and adipic acid. Examples of polyhydric alcohols that are used in the preparation of alkyd resins are: glycerol; pentaerythritol; and propylene glycol. Examples of monobasic fatty acids and sources of monobasic fatty acids which are used in preparing alkyd resins are pelargonic acid; isooctanoic acid; linseed oil; cottonseed oil; and tung oil. Exemplary number average molecular weights of alkyd resins prepared from such reactants are about 2,000 to about 3,000.

There are a wide variety of alkyd resins available which can be used in the practice of this invention. For example, the alkyd resin may be of the drying or non-drying type. Alkyd resins, the oil content of which varies widely or which contain varying amounts of phthalic anhydride, can be used also.

Alkyd resins of the type termed generally as modified alkyds can be used also. Modified alkyd resins are prepared by including in the esterification a reactant which imparts one or more desired properties to the alkyd resin produced. Examples of such reactants or modifiers are: isocyanates; silicones; phenolics; epoxides; and rosin.

The polyester resin in the film-forming resinous coating composition can comprise a major or minor proportion of said coating composition. In this connection, it is noted that many alkyd resins are compatible with other film-forming polymeric materials and when combined therewith, the alkyd resins impart desired properties to the resulting composition or to the film or coating that is formed. Durability and coating flexibility are examples of such properties. Examples of such other film-forming polymeric materials are vinyls, epoxies, acrylics, styrene/butadiene and phenol/formaldehyde resins. Resinous coating compositions containing but a minor proportion of an alkyd resin for example, at least about 2 wt. percent can be used in the practice of this invention.

On the other hand, the polyester resin can constitute the principal film-forming resin or resinous ingredient in the coating composition. Speaking generally, such compositions can comprise about 20 to about 40 wt. percent of the polyester resin. Other materials are often blended into such coating compositions to impart beneficial properties to the composition or the coating formed therefrom. Examples of such materials are nitrocellulose, chlorinated rubber and epoxies.

The film-forming resinous coating composition containing the polyester resin can be pigmented or non-pigmented. For the purpose of convenience, the term "alkyd paint" when used herein includes within its meaning both pigmented and non-pigmented film-forming resinous coating compositions in which the principal film-forming resin or resinous ingredient is an alkyd resin.

The film or coating formed from the polyester-containing, film-forming resinous coating composition can be an undercoating or a final finish comprising a continuous polymeric film which is preferably free of voids and uniform in thickness. Many of the available film-forming resinous coating compositions need to be baked after application in order to be formed into a continuous film. Although in some applications, said resinous coating composition can be air dried, it will be more practical most of the time to bake said composition in order to form it into the continuous film. The continuous film or coating formed from the polyester-containing, film-forming resinous coating composition will be substantially greater in thickness than an underlying film of adhesion improver.

As mentioned above, adhesion improvers included within the scope of this invention are polyesters and polyamides.

The polyesters can be formed by the condensation reaction between an alcohol and either an organic acid or an inorganic acid or their derivatives such as anhydrides and acyl halides; they can be prepared also by polymerizing a hydroxyl-containing carboxylic acid. In preparing the polyester adhesion improver, the reactants should be selected so that relatively long chain molecules having many ester linkages will be produced. This can be accomplished by polymerizing a polyhydric alcohol with a polybasic acid. In general, best improvements in paint adhesion properties have been attained when both reactants are poly-functional in nature, that is, the alcohol is a polyol and the acid has two or more carboxyl groups.

The polyester adhesion improvers, which can contain aliphatic or aromatic groups, can be saturated or unsaturated. Exemplary reactants that can be used to prepare the polyesters are dihydric and trihydric alcohols, as well as higher numbered hydroxyl-containing alcohols, including polymers having a substantial number of hydroxyl groups. Similarly, dibasic and tri-basic acids, as well as higher numbered carboxyl-containing acids, including polymers which contain a substantial number of carboxyl groups, can be used in preparing the adhesion improvers of this invention. When an inorganic acid is the acid reactant in the esterification, it should be reacted with a polyol.

Examples of organic acids and anhydrides that can be used to prepare the polyester adhesion improvers include lauric acid, glutaric acid, decane-dicarboxylic acid, isophthalic acid, hexahydrophthalic anhydride, itaconic acid, citric acid and polymers containing a substantial number of carboxyl groups such as polymethylvinylether maleic acid and carboxy methyl cellulose.

Examples of inorganic acids that can be reacted with alcohols to prepare polyester adhesion improvers within the scope of this invention include phosphoric acid, boric acid, and sulfuric acid.

Examples of alcohols that can be used to prepare the polyester adhesion improvers include propylene glycol, butylene glycol, erythritol, and polymers containing a substantial number of hydroxyl groups such as polyvinyl alcohol.

Other materials not referred to commonly as alcohols or acids, but which contain hydroxyl or carboxyl groups can be used also to prepare the polyester adhesion improvers. Examples of such materials include starch and cellulose.

As mentioned hereinabove, the preferred adhesion improver of this invention is starch phosphate. The use of starch phosphate has resulted in excellent improvements in the paint adhesion properties which improvements have been obtained by utilizing relatively small amounts of this material. In addition, the starch, phosphate which is available commercially at a relatively low cost, has little or no adverse affects on corrosion resistant properties.

An example of a starch phosphate which is derived from corn starch and which can be used in the practice of this invention is Standard Grade ARD — 1230 (American Maize Products Company) which analyzes as follows:

| | |
|---|---|
| Moisture, % | 4.5 |
| Protein, % | 0.3 |
| Ash, % | 7.1 |
| Sodium (calculated), % | 1.8 |
| pH | 7.1 |
| Solubility | Cold water soluble |
| Viscosity, Brookfield — No. 4 spindle at 6 RPM, 5% aqueous solution, as is, at 25°C, cps | 20,000 |
| Color of dry powder | Light tan |
| Gel strength - No gel information when paste from viscosity determination is aged 24 hrs. at 25°C. | |

Starch phosphates, such as the one described above, can be prepared by impregnating or blending starch granules with an aqueous solution of an alkali metal phosphate, removing excess moisture and thereafter dry roasting the resultant product to esterify the starch (see U.S. Pat. No. 2,884,412). Starch phosphates so produced can contain about 1 to about 5 percent by weight of bound phosphorous based on the weight of the dry starch. The starch phosphates in water form clear dispersions which are believed to be colloidal in nature, but which, for convenience, are referred to usually as solutions.

Starch phosphates can be prepared by other methods also. For example, they can be prepared by reacting starch and phosphorous oxychloride in the presence of a hydrogen chloride acceptor such as, for example, pyridine. In addition, starch phosphates can be prepared by the reaction of orthophosphoric acid and corn starch.

Speaking generally, the amount of bound phosphorous in the starch phosphate comprises a minor portion of the starch molecule. For example the starch phosphate can contain about 0.1 percent to about 8.0 percent by weight of bound phosphorous.

As to the polyamides and their use as adhesion improvers in the practice of this invention, they can be prepared according to any available method. For example, they can be prepared by tye condensation reaction between a polycarboxylic acid and a polyamine; or by reacting a polycarboxylic acid with a hydroxy amine; or by the polycondensation of amino acids. As with the polyester adhesion improver, the reactants for preparing the polyamides should be selected so that relatively long chain molecules having many amide linkages

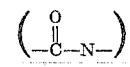

will be produced.

Exemplary organic acids that can be used to prepare the polyamide adhesion improvers are sebacic, succinic, azelaic and oxalic acid.

Examples of amines that can be used to prepare the polyamide adhesion improvers include diethanolamine, hexamethylenediamine and propylenediamine.

The following are examples of amino acids that can be polymerized to prepare polyamide adhesion improvers: glycine, alanine and 4-aminobutyric acid.

The reactions by which the polyester and polyamide adhesion improvers are made are well known, of course, and thus they warrant no description herein.

However, in order to obtain the operating advantages of the present invention to the fullest extent, it is recommended that the reactants and reaction conditions be selected so that the adhesion improver produced is a long chain molecule which is water soluble or colloidally dispersible. This allows the adhesion improver to be deposited on the metallic surface or the pre-paint coated metallic surface from an aqueous solution. (The term "solution" as used herein includes true solutions and colloidal dispersions.) This is a great practical advantage.

It is believed to be impractical, if not impossible to describe the polyester and polyamide adhesion improvers by molecular weight, viscosity, etc. because of the many different types of reactants that can be used and the very different types of polyesters and polyamides that are operable. However, with respect to the preferred mode of practicing the invention, that is, by utilizing aqueous solutions of the polyester or polyamide, it is recommended that the reactions by which they are made be allowed to continue until the reaction products increase in molecular weight to the greatest extent that is compatible with their being water soluble or colloidally dispersible.

As mentioned briefly above, the adhesion improver can be present on the metallic surface or pre-paint coating in the form of a continuous or discontinuous film or as discrete particles. A discontinuous film appears as blotches of film on the surface or coating. A continuous or discontinuous film tends to be formed when the adhesion improver is applied from a true solution. Such films can be monomolecular in thickness or a few or several molecules thick. On the other hand, when the adhesion improver is applied from a colloidal solution or from a suspension it can be present on the surface in the form of discrete particles.

It is believed that the improved paint adhesion properties of this invention are attained as a result of a reaction between the adhesion improver and the polyester resinous ingredient in the film-forming resinous coating composition. When the adhesion improver is a polyester, the reaction can include an ester exchange, referred to also as transesterification, that is, a hydrocarbon group of the polyester paint adhesion improver links to the $-O$ of an ester group in the polyester resin of the overlying resinous film or coating as a hydrocarbon group from that polyester resin links with the $-O$ of an ester group in the underlying polyester adhesion improver. The structural formulas set forth below illustrate this in a very simplified way with the top structural formula representing a polyester resin in the resinous film or coating and the bottom formula representing a polyester adhesion improver.

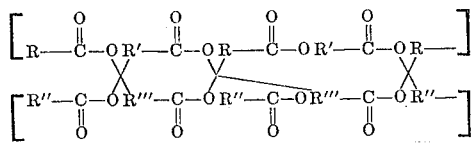

The bonds above are a simplified illustration of how the different polyesters can link together to thereby become integral.

With respect to the use of a polyamide adhesion improver, a similar type of interchange can take place between the hydrocarbon groups, except that the groups link to the $-N$ atom of the

group.

Thus, the present invention provides a method for improving the adhesion between a metallic surface or a pre-paint coating carried on a metallic surface and a coating formed from a film-forming resinous coating composition by applying to said surface or said pre-paint coating an adhesion improver material which is capable of reacting chemically with said coating composition. Upon reacting, molecules of the resin in the continuous polymeric film that is formed from the coating composition and molecules of the adhesion improver become linked. It can be seen from the illustration above that molecules of each of the adhesion improver and the resin of the coating composition have many reactable sites and that atoms of the one molecule are bonded to atoms of the other molecule. In those situations where heat is applied to the coated metallic surface to accelerate the formation of the continuous polymeric film, the heat can function also to accelerate the chemical reaction between the adhesion improver and the coating composition. It should be understood, however, that the adhesion improver can react with the resinous coating composition in the absence of heat.

In the development of this invention, it has been found that the treatment of a bare metallic surface, that is, one which carries no pre-paint coating, with the adhesion improvers of this invention improves the bond between the polyester film-forming resinous coating composition applied subsequently and the thus treated surface. Improvements in the paint bond can be obtained also if the adhesion improver is applied to a metallic surface which carries no pre-paint coating, but is one which has been pre-treated in some other way--for example pre-treated to activate the metal. For most applications, the adhesion improvers will be applied to a metallic surface that has thereon a pre-paint coating which has corrosion resistance properties.

Any suitable pre-paint coating can be used. It can be of the type which is bonded chemically to the metallic surface or it may be bonded physically thereto. The pre-paint coating may be either organic or inorganic. It can be crystalline or amorphous in nature. The coating can be applied by an electrolytic process or in the absence of an applied current. The coatings can be formed from ingredients in the coating composition and they can include also amounts of the metal being coated; and they can be formed also from ingredients which are the product of a reaction between the ingredients of the coating composition, which reaction may or may not include ions of the metallic surface.

The term "pre-paint coating" when used herein means coatings for metallic surfaces which coatings are bonded chemically or physically to the metallic surface and which coatings have corrosion resistant and/or paint adhesion properties and which coatings underlie a film-forming resinous coating composition applied thereto.

Representative types of pre-paint coatings and the coating compositions or solutions from which they are formed are discussed in Preparation of Metals for Painting by Samuel Spring, Ph.D., Reinhold Publishing Corporation, New York, 1965.

Generally speaking, pre-paint coatings are formed on metallic surfaces from coating solutions, most often aqueous solutions, which are applied to the metallic surface in any one of a variety of ways, including, for example, spraying, rolling, brushing or immersing the metallic surface in a bath of the solution. For exemplary purposes, there are described generally in the next few paragraphs some of the more popularly used pre-paint coatings; the description includes exemplary types of coatings, the metals on which they are deposited and a general description of the coating compositions from which they are formed. It will be recognized that such coating compositions form coatings which are often referred to as "conversion coatings."

Zinc phosphate coatings are corrosion resistant, paint adherent coatings which can be applied to such metallic surfaces as, for example, ferriferous (iron-containing, including steel) aluminum, cadmium, and zinc (including galvanized surfaces). Zinc phosphate coatings can be formed from aqueous coating solutions prepared from zinc oxide and phosphoric acid, and the solution contains usually an oxidant such as, for example, chlorate, nitrate, or nitrite.

Acidic aqueous solutions prepared from an alkali metal phosphate are used to form iron phosphate coatings on ferriferous surfaces.

Alkaline chromate solutions prepared from alkali metal chromates or dichromates can be utilized to form paint adherent coatings on aluminum.

Acidic aqueous coating solutions containing fluoride, phosphate and dichromate are utilized to form chromate/phosphate coatings on aluminum.

Also, chromate/fluoride coatings formed from acidic aqueous solutions of chromate and fluoride are used to inpart corrosion resistant and paint adherent properties to aluminum.

Other examples of pre-paint coatings are oxalate coatings for ferriferous surfaces, mixed oxide and chromate coatings formed from aqueous solutions of chromic acid for ferriferous surfaces, chromate coatings for zinc, and also such coatings for magnesium as are formed from aqueous coating solutions of dichromate and aqueous solutions of ferric nitrate. And still other examples of pre-paint coatings that can be used in the practice of this invention are: organic coatings such as, for example, those formed from an aqueous solution containing a volatile alkali, a film-forming resin and hexavalent chromium as described in U.S. Pat. No. 2,921,858 and complex oxide coatings formed from alkaline baths of selected sequestered metal ions.

The adhesion improvers of this invention can be applied to the bare or pre-paint coated metallic surface by any suitable method which will leave the improver on the surface. They can be applied at room temperature or elevated temperature. From an economical standpoint, it is most practical to apply the adhesion improvers from an aqueous carrier. For example, after the application of a pre-paint coating solution to a metallic surface, it is rinsed with water usually for the purpose of removing spent or excess coating solution from the surface. The adhesion improvers of this invention can be incorporated in the rinse water. Or the adhesion improver can be incorporated in an aqueous final rinse composition. It is common practice to rinse pre-paint coatings with a final rinse composition which is effective in improving corrosion resistant properties and which may improve paint adhesion properties also. Presently, the most widely used final rinse compositions are aqueous solutions which contain chromium in one form or another. A typical chromium-containing final rinse is an aqueous solution which can contain from about 0.002 percent to about 0.01 percent by weight of hexavalent chromium.

In the practice of this invention, very good results have been obtained by applying the adhesion improver from a chromium-containing final rinse of the type that is disclosed in U.S. Pat. No. 3,063,877. The aqueous rinse solution disclosed therein is prepared from a concentrated aqueous acid solution of chromic acid which solution has been treated with formaldehyde to reduce a portion of the hexavalent chromium. More specifically, the rinse solution can be prepared by reacting a concentrated aqueous acidic solution containing from about 40 to about 800 grams per liter of hexavalent chromium (expressed as $CrO_3$) with formaldehyde to reduce about 5 to about 60 wt. percent of the chromium and thereafter adding water to the concentrated solution in an amount such that the final rinse solution contains from about 0.15 to about 10 grams per liter of total chromium. About 40 to about 95 wt. percent of the chromium is in the hexavalent state with the remainder in the reduced state. Such rinse solutions can be used for rinsing pre-paint coatings applied to zinc, ferriferous and aluminum surfaces to improve corrosion resistance. By incorporating the adhesion improver in such a final rinse solution, it is possible to improve markedly paint adhesion properties also.

In applications in which a final rinse is employed and in which the adhesion improver is applied from a water rinse, the metallic article upon withdrawal from the water rinse can be placed directly into the final rinse without first drying the water-rinsed article. On the other hand, if no final rinse is employed, then the metallic article should be dried after the adhesion improver is applied from the water rinse and before the film-forming resinous coating composition is applied. Similarly, when the adhesion improver is applied from a final rinse, the liquid carrier should be evaporated prior to the application of the film-forming resinous coating composition.

As mentioned above, after the application of the film-forming resinous coating composition, it will be necessary usually to bake the coating in order to form a continuous film. On the other hand, it is not necessary to bake the adhesion improver after it is applied to the metallic surface or the pre-paint coating. Evaporation of the liquid carrier prior to painting is sufficient.

It should be understood that the adhesion improvers can be applied from other types of final rinse compositions, including "non-chromium"containing final rinse compositions.

As mentioned above, the preferred adhesion improvers are those which can be dissolved in an aqueous carrier or those which will form an aqueous colloidal solution. Although suspensions of the adhesion improvers can be used, they generally will require agitation equipment to maintain the particles suspended in the liquid carrier.

Although it appears that the adhesion improvers can be applied most practically and economically from a water carrier, they can be applied also from a non-aqueous medium. For example, it will be readily apparent that adhesion improvers within the scope of this invention are soluble in organic solvents such as, for example, butyl cellusolve, ethanol, butanol, xylene, and toluene.

Solutions containing the adhesion improver can be applied in any suitable way. It should be apparent from what has been stated hereinabove, that the solution can be applied by existing equipment in industrial metal pre-treatment lines — for example, equipment which applies water rinses or final rinses to the pre-paint coatings.

It is not only difficult, but also impractical to give guidelines on the minimum and maximum amounts of adhesion improver that should be deposited on the metallic surface or the pre-paint coating. The difficulty arises because of numerous variables that are inherent in the process, including both the pretreatment and painting steps of the process and also the specific adhesion improver employed. The variables can influence the results that are obtained, that is, the deposition of a specific amount of adhesion improver under one set of conditions may give a different result under a different set of conditions. The following are examples of variables that can have a bearing on the amount of adhesion improver to be deposited: the particular film-forming polyester that is used in the film-forming resinous coating composition; the specific type of metal or pre-paint coating that is used; and the specific adhesion improver that is applied.

From a practical standpoint it is believed that it is much easier to apply varying amounts of the adhesion improver until the desired result is achieved than it is to analyze the surface for the amount of adhesion improver thereon.

Notwithstanding the various factors that may have to be taken into account in depositing appropriate amounts of the adhesion improver, it is suggested on the basis of experience with many different types of polyesters and polyamides that improvements in paint adhesion can be realized when the metallic surface is subjected to a solution which contains at least about 0.001 percent by weight of adhesion improver for a period of time as short as necessary to wet the surface and as long as about 1 minute. The upper limit on the amount of adhesion improver used in the solution appears to be dictated by solubility factors, economic considerations and any adverse effect that excess amounts of the adhesion improver might have on the coated surface. There has been some evidence that excess amounts of the adhesion improver can tend to affect corrosion resistant properties adversely. In the case of starch phosphate, this has occured with aqueous solutions containing in excess of about 0.3 wt. percent starch phosphate. It is recommended that solutions comprising about 0.02 to about 0.2 percent by weight of the adhesion improver be used. However, it should be understood that greater or somewhat smaller amounts can be used in the solution and/or the contact time between solution and the surface varied in order to achieve the desired result. Suffice it to say that the amount of adhesion improver deposited on the surface should be an amount such that the desired improvements in paint adhesion are realized.

The amount of adhesion improver applied is relatively small compared to the amount of film-forming resinous coating composition applied subsequently. Thus, the weight of the adhesion improver per unit area of surface is substantially less than the weight of the polymeric coating or film formed from the film-forming resinous coating composition. It is noted that there are applications in which a primer or prime coat of film-forming resinous coating composition is applied prior to the application of a top-coat of film-forming resinous coating composition. The weight per unit area and the thickness of a film of adhesion improver will be substantially less than the weight and thickness of a conventional prime coat, which, for example, may have a thickness as small as about 0.1 to about 0.3 mils; these are characteristics which distinguish a film of adhesion improver from a prime coat, as well as a top-coat, formed from film-forming resinous coating compositions.

TESTS

Tests which were used to evaluate the paint adhesive properties of metallic surfaces treated according to this invention and the results of which are reported in the Example section hereinbelow are described hereafter.

Olsen Cup Test

This test is designed to evaluate paint adhesion under conditions which simulate a forming operation on metal. Generally speaking, the test involves the use of a hand operated ductility testing machine which is used to apply a load gradually to a painted metallic test panel by means of a screw type mechanism having mounted thereon a ball which forms a cup in the panel.

The machine used in the test is sold by Tinius Olsen Test Machine Company under the name "Hand Operated Ductility Tester." The load is applied to a test panel and the cup is formed therein by a ball seven-eighths inch in diameter and positioned at the end of the screw type mechanism of the test machine. The test panel, 0.026 inch in thickness, is clamped firmly to the test machine in a position such that the ball is forced against the unpainted side of the test panel as the screw type mechanism is turned. The load is applied until the metal fractures. (In the examples reported herein, this happened when the depth of the cup formed in the test panels by the ball was about 0.30 inch.) Thereafter the load on the test panel is released and the convex painted side of the cup is checked for cracking and adhesion of the paint film. (It is noted that cracking of the paint film, without loss of adhesion to the metallic substrate, is caused by lack of cohesion of the paint and is not related to the bond between the paint and underlying surface.) To determine paint adhesion, Scotch Brand No. 600 tape is applied to the convex painted surface of the cup and then removed. Paint adhesion properties are expressed as the percent of paint lost to the tape in the test area of the panel.

Taper Bend Test

This test is designed to evaluate paint adhesion under conditions which simulate roll forming of a painted metal strip. A metallic test panel is bent by hand to an angle of about 180° with the painted side of the panel on the outside of the bend. The bend is completed by placing the panel in a machinist vise, the jaws of which have been positioned such that the space between them is wedge-shaped. As the vise is closed, it bends the panel so that its edges are together at one end, and one-fourth inch apart at the other end. After the panel is so bent, it is removed from the vise and inspected. A No. 600 Scotch Brand Tape is applied to the paint of the bend and then removed. Paint adhesion properties are measured by the percent of paint lost to the tape and by measuring the distance from the edge of the closed-end of the panel on the bend to the farthest point on the bend from which paint has been removed. Cracking of the paint film absent a loss of adhesion to the panel is caused by a lack of cohesion of the paint film and not to paint adhesion properties.

EXAMPLES

The first group of examples is illustrative of the use of starch phosphate as an adhesion improver in accordance with this invention. Various types of metallic surfaces, having thereon pre-paint coatings, were rinsed with an aqueous solution containing 0.3 wt. percent starch phosphate (Standard grade ARD-1230 sold by American Maize-Products Company). No other ingredients were added to the solution.

A group of mild steel Q panels, hot dipped galvanized steel panels and aluminum Q panels were each processed as follows:

1 cleaned with an alkaline cleaning solution;
2 rinsed with tap water;
3 rinsed with a grain refiner (only for the zinc phosphate coated panels);
4 pre-paint coated as identified in Table 1 below;
5 rinsed with the above identified aqueous solution of 0.30 wt. percent starch phosphate by immersing the test panels in the solution for 10 seconds;
6 rinsed with an aqueous final rinse solution of hexavalent chromium and reduced chromium for 10 seconds;
7 squeeged and air dried; and
8 painted by draw bar technique with a polyester paint, a white alkyd high gloss enamel sold by Dupont under the name of Refrigerator White High Gloss No. 706-B-98591; the paint film (1 mil in thickness) was cured by baking at 300°F for 30 minutes.

The panels were then subjected to the tests referred to in Table 1 below. Another group of panels was treated in exactly the same way except that after the pre-paint coating was applied, they were rinsed with tap water instead of the aforementioned aqueous solution of starch phosphate. For comparative purposes, these panels were tested also and their test results are set forth in Table 1 below.

The striking improvements provided by the invention are evident from the data reported in Table 1 above. It is noted that the improvements in the paint adhesion properties of the metallic panels were achieved with little or no sacrifice in the corrosion resistant properties. It is noted also that another group of test panels was treated according to the same procedure as the test panels of Table 1, except that they were painted with an acrylic paint instead of an alkyd paint, and little or no improvement in the paint adhesion properties of the acrylic paint was obtained; in fact, in some cases, the paint adhesion properties were affected adversely.

Examples 1–5 of Table 1 illustrate also that the adhesion improvers of this invention can be applied to the pre-paint coating and thereafter rinsed with a final rinse solution such as the hexavalent/reduced chromium rinse solution used in the examples. Contrary to what might be expected, the starch phosphate was not washed off the panels by the rinse solution. The test panels were viewed under a microscope after the hexavalent/reduced chromium final rinse was used and before the alkyd paint was applied and particles of starch phosphate were visible.

The next group of examples illustrates the application of an adhesion improver of this invention to a metallic surface having thereon a pre-paint coating by applying thereto the adhesion improver from a final rinse solution (in contrast to its application prior to a final rinse treatment as in Examples 1–5). A set of hot dipped galvanized panels was processed as follows:

1 cleaned with an alkaline cleaning solution;
2 rinsed with tap water;
3 rinsed with an activator;
4 coated with a zinc phosphate coating formed from an aqueous solution containing zinc oxide, phosphoric acid and nitric acid;
5 rinsed with tap water;
6 rinsed with a final rinse solution containing a starch phosphate and hexavalent/reduced chromium by immersing the phosphate coated panel for 10 seconds into a bath of the rinse solution, the temperature of which was 120°F; and
7 squeeged and air dried; and
8 painted by draw bar technique with a polyester paint, a white alkyd high gloss enamel sold by Dupont under the name of Refrigerator White High Gloss No.

TABLE 1

| Example number | Metal | Pre-paint coating | Starch phosphate rinse | Adhesion Olsen cup percent [6] | Taper bend In.[7] | Taper bend Percent [8] | Salt spray ASTM B-117 in 32nd inch [9] |
|---|---|---|---|---|---|---|---|
| 1A | Steel | Iron phosphate [1] | No | 45 | 2 | 28 | 1 |
| 2 | do | do | Yes | 0 | 0 | 0 | 3 |
| 2A | do | Zinc phosphate [2] | No | 40 | 2 | 29 | 3 |
| 3 | do | do | Yes | 6 | 1 | 3 | 5 |
| 3A | Galv | Chromate [3] | No | 50 | 2⅛ | 40 | 2 |
| 4 | Galv | do | Yes | 0 | 0 | 0 | 2 |
| 4A | Alum | Chromate/fluoride [4] | No | 20 | 1¼ | 10 | 0 |
| 5 | Alum | do | Yes | 0 | 0 | 0 | 0 |
| 5A | Alum | Chromate/phosphate [5] | No | 40 | 1¾ | 15 | 0 |
|  | Alum | do | Yes | 0 | 0 | 0 | 0 |

[1] The iron phosphate coating was formed from an aqueous solution containing phosphoric acid, soad ash and sodium chlorate.
[2] The zinc phosphate coating was formed from an aqueous solution containing zinc oxide, phosphoric acid, nickelous oxide and sodium chlorate.
[3] The chromate coating was formed from an aqueous solution containing chromic acid, zinc oxide, hydrochloric acid, and fluosilicic acid.
[4] The chromate/fluoride coating was formed from an aqueous solution containing hydrofluoric acid, chromic acid and potassium ferricyanide.
[5] The chromate/phosphate coating was formed from an aqueous solution containing a phosphoric acid, chromic acid, hydrofluoric acid, and hydrogen peroxide.
[6] Percent of test area incurring paint loss.
[7] Distance in inches from edges of closed end of panel to farthest point on bend at which there was paint loss.
[8] Percent of area incurring paint loss.
[9] All test panels except the aluminum test panels were subjected to the salt spray test for 240 hrs.; the aluminum panels were subjected to the test for 1,000 hrs. The test results represent the average width of failure from the scribe.

706-B-98591; the paint film (1 mil in thickness) was cured by baking at 300°F for 30 minutes.

With respect to step (6) above, the starch phosphate was Standard Grade ARD-1230 as identified above. The final rinse solution was prepared from an aqueous concentrate which was prepared by dissolving about 42.1 parts by wt. of chromic acid in about 50.5 parts by wt. of water and thereafter adding about 7.4 parts by wt. of formaldehyde (37 percent). The solution was stirred for about 45 minutes until dissolved gases escaped and thereafter cooled. Water was added to adjust the specific gravity of the concentrate to 1.426 at 60°F. The concentrate was diluted with an amount of water such that the concentrate comprised about 0.2 percent by wt. of the final rinse solution and suitable amounts of starch phosphate were added to separate portions of this rinse solution to give the concentrations set forth in Table 2 below.

The test panels were subjected to the tests referred to in Table 2 below. For the purposes of comparison, another set of test panels was treated in exactly the same way except that the final rinse solution contained no starch phosphates. The test results of these panels are set forth also in Table 2.

TABLE 2

| Ex. No. | Amt. of Starch Phosphate in Cr Aqueous Rinse Solution, % by Weight | Test Results Adhesion | | | Salt Spray ASTM B-117, in 32nd inch* |
|---|---|---|---|---|---|
| | | Olsen Cup %* | Taper in.* | Bend %* | |
| 6A | 0 | 14 | 1 | 5 | 1 |
| 6 | 0.01 | 0 | 0 | 0 | " |
| 7 | 0.05 | " | " | " | " |
| 8 | 0.10 | " | " | " | " |
| 9 | 0.15 | " | " | " | 3 |
| 10 | 0.25 | " | " | " | 2 |
| 11 | 0.35 | " | " | " | 3 |

* as set forth in Table 1

Some general comments concerning the present invention can be made on the basis of the test results reported in Table 2 above. From Examples 6-11, it can be seen that excellent improvements in paint adhesion can be obtained with the use of, but relatively small amounts, of starch phosphate in the final rinse solution. The percent of starch phosphate used in Example 6 corresponds to only about 0.10 gram per liter of final rinse solution. It is noted also that the test results of Table 2 make it evident that the improvements in paint adhesion are obtained with little or no loss in the corrosion resistant properties of the coated metallic surfaces.

Aqueous final rinse solutions of the type utilized in the Examples 6-11 were prepared and then allowed to stand for extended periods of time for the purpose of checking their stability. The rinse solutions were stable and effective in use after a 6 month period at which time the stability test was discontinued. It was noticed during the periodic checking of the final rinse solutions that there was some decrease in the hexavalent chromium concentration. However, this appeared to have no adverse affect on the effectiveness of the rinse solution.

In the development of this invention, it was found that the addition of starch phosphate to an aqueous concentrate of the type utilized to prepare the dilute final rinse solutions of Examples 6-11 resulted in the formation of a rigid gel; however, upon dilution with water, the resulting final rinse solution was used effectively. On the other hand, when the aqueous concentrate was allowed to stand for about an hour after preparation, the gel became watery; and a rinse solution made from the aged watery concentrate was not effective. Thus, it is recommended that when preparing final rinse solutions of the type reported in Table 2 above, the starch phosphate be added to the dilute aqueous final rinse solution and not the concentrate.

The next group of examples is illustrative of the use of some different polyester-type adhesion improvers within the scope of this invention. A set of hot-dipped galvanized steel test panels was coated with a zinc phosphate coating solution containing zinc oxide, phosphoric acid and nitric acid. The zinc phosphate coating weighed about 250 mg. /ft.$^2$. The coated panels were rinsed first with tap water and thereafter with the chromium-containing final rinse solution used in Examples 6-11 above, but containing 0.2 wt. percent of the polyester prepared from the acid and alcohol reactants set forth in Table 3 below instead of starch phosphate. The test panels were immersed for 10 seconds in this final rinse solution which was heated to a temperature of 120°F. After being withdrawn, they were squeeged and allowed to air dry. The panels were then painted in the same way and with the same paint as used in Examples 1-11.

The following procedure was utilized to prepare the polyesters from the acid and alcohol reactants set forth in Table 3 below. For those reactants for which a molecule weight was known (for all but polymethylvinylether maleic acid, polyvinyl alcohol and hydroxyethyl cellulose), equimolar quantities of the reactants were mixed together. When the molecular weight of a reactant was unknown, the reactants were combined in equal parts by weight. When both reactants were solids, they were dissolved and reacted in aqueous solution; otherwise the liquid reactant or reactants formed the liquid reaction mixture. The reaction mixture was heated to 140°C at which temperature a large portion of the water by-product had evaporated. The removal of water permitted the polyester to increase in molecular weight. The reaction was allowed to continue until the reaction mixture thickened and increased in viscosity to the extent that it had a consistency similar to molasses. Thereafter the reaction mixture was allowed to cool and 0.2 percent by weight of the polyester was added to the hexavalent/reduced chromium final rinse solution referred to above. Upon adding the polyesters to the final rinse solutions, they dissolved therein.

Due to the great number of tests that were performed in assembling the data reported in Table 3 below, there were used for comparative purposes a number of control panels, that is, panels which were treated in the same way as described above except that they were rinsed with a hexavalent/reduced chromium rinse solution which contained no polyester. Each set of test panels that was processed was compared with a control panel for that particular set of panels. The results reported in Table 3 are ratings which represent an increase or decrease in the quality of the test panels over the control panels which were assigned a rating of 5. A rating of 10 represents perfect performance.

TABLE 3

| Example Number | Polyester forming reactants | | Test results | | |
| --- | --- | --- | --- | --- | --- |
| | | | Adhesion | | Salt spray ASTM, B-117, 240 hrs. |
| | Acid | Alcohol | Olsen cup | Taper bend | |
| 12 | Polymethylvinyl ether maleic acid | Polyvinyl alcohol | 10 | 10 | 5.0 |
| 13 | Phosphoric acid | do | 10 | 10 | 4.8 |
| 14 | Maleic acid | do | 10 | 10 | 5.4 |
| 15 | Sebacic acid | do | 10 | 10 | 5.3 |
| 16 | Oxalic acid | do | 10 | 10 | 5.0 |
| 17 | Citric acid | Glycerol | 10 | 10 | 5.2 |
| 18 | do | Ethylene glycol | 10 | 10 | 5.1 |
| 19 | Maleic acid | Hydroxyethyl cellulose | 10 | 10 | 5.0 |
| 20 | Fumaric acid | do | 9.5 | 9.3 | 5.0 |
| 21 | Azelaic acid | do | 9.5 | 9.2 | 4.9 |
| 22 | Fumaric acid | Glycerol | 9.5 | 9.5 | 5.0 |
| 23 | Polymethylvinyl ether maleic acid | do | 9.2 | 9.4 | 5.0 |
| 24 | do | Ethylene glycol | 9.5 | 9.2 | 5.0 |
| 25 | Phosphoric acid | Hydroxyethyl cellulose | 9.2 | 9.0 | 4.4 |
| 26 | do | Glycerol | 9.2 | 9.0 | 4.0 |
| 27 | Boric acid | do | 9.0 | 9.0 | 4.8 |
| 28 | do | Ethylene glycol | 9.0 | 9.0 | 4.6 |
| 29 | Oxalic acid | Glycerol | 9.0 | 9.0 | 4.9 |
| 30 | do | Ethylene glycol | 9.0 | 8.5 | 4.8 |
| 31 | Phosphoric acid | do | 6.5 | 7.0 | 4.2 |
| 32 | Azelaic acid | do | 6.5 | 6.5 | 4.8 |
| 33 | Adipic acid | Resorcinol | 6.2 | 6.3 | 5.0 |
| 34 | Sebacic acid | Ethylene glycol | 6.2 | 6.5 | 5.1 |
| 35 | Maleic acid | Hydroquinone | 6.3 | 6.0 | 4.9 |
| 36 | Phosphoric acid | do | 6.0 | 6.0 | 4.0 |

Excluding the inorganic acids, each of the reactants in Table 3 is either a polycarboxylic acid or a polyhydric alcohol. Included among the examples are dicarboxylic acids, tricarboyxlic acids and di- and tri-hydric alcohols; compounds with greater numbers of hydroxyl and carboxyl groups are illustrated by the use of polyvinyl alcohol and polymethylvinylether maleic acid. It is noted that Examples 12-16 show that polyesters prepared from the long chain polyvinyl alcohol reactant give top performance; likewise for the polyester prepared from the tri-carboxyl and tri-hydroxyl reactants of Example 17 and the tricarboxyl and di-hydroxyl reactants of Example 18. Again it is noted that the improvement in paint adhesion is obtained with little or no sacrifice in the corrosion resistant properties; indeed in some cases a slight improvement in the corrosion resistant properties was realized.

The next group of examples illustrates the use of adhesion improvers of the polyamide type. The polyamides that were used were prepared from the carboxylic acid and the diamine or the hydroxy-amine reactants set forth in Table 4 below. (It is noted that the polyamides prepared from the hydroxy-amine reactants contained both ester and amide linkages.) The polyamides were prepared from equimolar quantities of the reactants by simple addition of one to the other. The exothermic reaction was terminated by cooling the reaction mixture when a temperature of 140°C had been reached and when the mixture had thickened and increased in viscosity to the extent that it had a consistency similar to molasses. The effectiveness of the polyamides as an adhesion improver was determined by treating and evaluating a group of test panels in the same way as those of the examples of Table 3, except that the phosphate coatings applied were rinsed with a hexavalent/reduced chromium final rinse solution that contained 0.2 percent by weight of the polyamides.

TABLE 4

| Ex. No. | Polyamide forming reactants | | Test results | | |
| --- | --- | --- | --- | --- | --- |
| | | | Adhesion | | Salt spray ASTM B-117, 240 hrs. |
| | Acid | Amine | Olsen cup | Taper bend | |
| 37 | Citric acid | Ethanolamine | 10 | 10 | 4.0 |
| 38 | Adipic acid | Ethylenediamine | 10 | 10 | 4.0 |
| 39 | do | Ethanolamine | 9.8 | 9.5 | 4.6 |
| 40 | Maleic acid | Triethanolamine | 9.5 | 9.5 | 4.0 |
| 41 | do | Ethylenediamine | 9.5 | 9.5 | 2.1 |
| 42 | Adipic acid | Urea | 9.0 | 9.5 | 3.6 |
| 43 | Maleic acid | Ethanolamine | 9.0 | 9.3 | 3.8 |

From Table 4 above, it should be appreciated that each of the polyamides improved paint adhesion markedly. With respect to the last three examples the overall performance was somewhat offset as a result of a reduction in the corrosion resistant properties.

In another series of tests, there were used two different film-forming resinous coating compositions that contained unsaturated polyesters prepared from unsaturated dicarboxylic acids and diols. These coating compositions, which were paints gray and green in color, contained also a vinyl monomeric crosslinking agent. Improvements in paint adhesion were attained when zinc phosphate coated metallic panels were rinsed, prior to painting, with an aqueous final rinse solution that contained starch phosphate. Thus, this series of tests exemplified the use of a polyester-containing paint, but one not generally classified as an alkyd paint — the paint used in the previous examples.

The examples reported hereinabove illustrate the very great extent to which this invention provides improvements in the adhesion of a continuous polymeric film or coating to a metallic substrate coated with a pre-paint coating. Overall, it can be said that these improvements can be attained in a relatively uncomplicated, economic and practical way.

We claim:

1. A method for coating a metallic surface comprising:

A applying to said metallic surface a pre-paint coating-forming solution which forms on said surface a pre-paint conversion coating;

B applying to said pre-paint conversion coating while wet a polyester or polyamide adhesion improver in adhesion improving amounts by rinsing said wet pre-paint conversion coating with a liquid solution containing said polyester or polyamide adhesion improver;

C applying to the thus treated coating a film-forming resinous coating composition containing a polyester resin; and D chemically linking said polyester resin to said adhesion improver through a multiplicity of bonds by reacting said polyester resin with said adhesion improver;

thereby improving the adhesion between said pre-paint conversion coating and the coating formed from said resinous composition.

2. The method according to claim 1 wherein starch phosphate is applied to said wet pre-paint conversion coating.

3. The method according to claim 1 wherein said wet pre-paint conversion coating is rinsed with an aqueous solution containing said polyester or said polyamide.

4. The method according to claim 3 wherein said aqueous solution is a final rinse solution.

5. A method for coating a metallic surface comprising:
   A applying to a metallic surface a pre-paint coating-forming solution which forms on said surface a pre-paint conversion coating;
   B applying to said pre-paint conversion coating while wet a water soluble or colloidally dispersible polyester or polyamide adhesion improver, wherein said adhesion improver is applied from a water rinse which is applied to said pre-paint conversion coating to remove therefrom excess or spent pre-paint coating solution or from a final rinse solution after said pre-paint conversion coating has been water rinsed to remove therefrom excess or spent pre-paint coating solution; and
   C thereafter applying an alkyd paint to the pre-paint conversion coating having thereon said adhesion improver;
wherein the amount of adhesion improver applied is sufficient to improve the bond between the paint film formed from said alkyd paint and said pre-paint conversion coating.

6. The method according to claim 5 wherein said adhesion improver is starch phosphate and wherein it is applied to said pre-paint conversion coating by rinsing it with an aqueous solution containing said starch phosphate.

7. A method for coating a metallic surface comprising:
   A applying a pre-paint conversion coating to said metallic surface;
   B applying an aqueous solution containing starch phosphate to said pre-paint conversion coating; and
   C applying an alkyd paint to said pre-paint conversion coating having thereon starch phosphate;
wherein the amount of starch phosphate on said pre-paint conversion coating is at least sufficient to improve the bond between said conversion coating and the paint film formed from said alkyd paint.

8. A method according to claim 7 wherein said pre-paint conversion coating is a zinc phosphate coating.

9. A metallic surface coated according to the method of claim 1.

10. A metallic surface coated according to the method of claim 5.

11. A metallic surface coated according to the method of claim 7.

* * * * *

UNITED STATES PATENT OFFICE
CERTIFICATE OF CORRECTION

Patent No. 3,776,782          Dated December 4, 1973

Inventor(s) Thomas J. Kiefer and Masamichi Nagatani

It is certified that error appears in the above-identified patent and that said Letters Patent are hereby corrected as shown below:

Column 13, Table 1, the alignment of the columns headed "Example number" and "Metal" should be as follows:

| Example number | Metal |
|---|---|
| 1A | Steel |
| 1  | do |
| 2A | do |
| 2  | do |
| 3A | Galv |
| 3  | Galv |
| 4A | Alum |
| 4  | Alum |
| 5A | do |
| 5  | do |

Column 13, Table 1, under heading "Pre-paint coating", "Iron phosphate", should read --Iron phosphate[1]--.

Column 13, first line of footnote (1), "soad" should read --soda--.

Column 15, Table 2, heading of first column should read--Ex. No.-- and heading of second column should read --Amt. of Starch Phosphate in Cr Aqueous Rinse Solution, % by Weight--.

Signed and sealed this 2nd day of July 1974.

(SEAL)
Attest:

EDWARD M. FLETCHER, JR.        C. MARSHALL DANN
Attesting Officer                Commissioner of Patents